Figure 1:
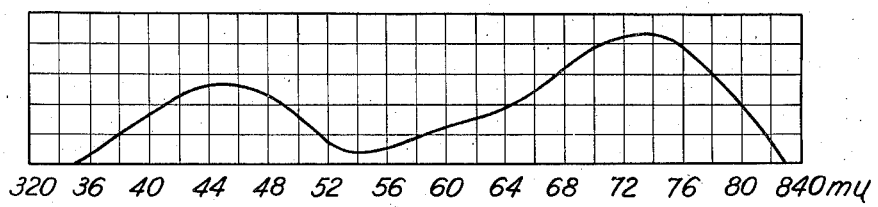

Aug. 5, 1941.　　　G. H. KEYES　　　2,251,286

PROCESS OF PREPARING OXATRICARBOCYANINE DYES

Filed Dec. 30, 1937

2,2'-Diethyloxatricarbocyanine Iodide 2,2'-DIETHYL-5.6.5'.6'-DIEBENZOXATRICARBOCYANINE-IODIDE 2,2'-Diethyl-5,6-benzoxatricarbocyanine Iodide Grafton H. Keyes
INVENTOR

BY
ATTORNEYS

Patented Aug. 5, 1941

2,251,286

UNITED STATES PATENT OFFICE 2,251,286

PROCESS OF PREPARING OXATRICARBOCYANINE DYES

Grafton H. Keyes, Rochester, N. Y., assignor to Eastman Kodak Company, Rochester, N. Y., a corporation of New Jersey Application December 30, 1937, Serial No. 182,522

3 Claims. (Cl. 260—240)

This invention relates to dyes which can be called oxatricarbocyanine, benzoxatricarbocyanine and dibenzoxatricarbocyanine dyes and to photographic emulsions containing such dyes.

Certain tricarbocyanine dyes have been prepared by condensing a cyclammonium quaternary salt containing a reactive methyl group with glutaconic aldehyde dianilide hydrochloride, in the presence of an inorganic basic condensing agent. This method is not sufficient to produce 4,4'-tricarbocyanine dyes from lepidine quaternary salts or oxatricarbocyanine dyes from 1-methylbenzoxazole quaternary salts, however. See Fisher and Hamer, Journal of the Chemical Society, 1933, page 190.

I have now found that oxa-, benzoxa- and dibenzoxatri-carbocyanine dyes can be prepared by condensing, in the presence of a strong organic base condensing agent, a 1-methylbenzoxazole or $\mu$-methylnaphthoxazole quaternary salt with a 1- (6-acylaryl-amino- $\Delta^{1,3,5}$-hexatrienyl) - naphthoxazole quaternary salt. I have found that my new dyes sensitize photographic emulsions to the far-red and infra-red in a new and useful manner.

An object of my invention, therefore, is to provide new dyes. A further object is to provide a process for the preparation thereof. A further object is to provide photographic emulsions sensitized with my new dyes. A further object is to provide a process for sensitizing emulsions to the far-red and infra-red. A still further object is to provide a photographic element comprising emulsions sensitized with my new dyes. The manner of accomplishing these objects and other more specific objects will become apparent upon a complete perusal of the specification and claims.

In preparing my new dyes, I first react a salt of an anil compound of the following formula:

I.  Q—NH—CH=CH—CH=CH—CH=N—Q' wherein Q and Q' represent aryl groups, such, for example, as those containing one benzene ring or those containing two benzene rings which may or may not be condensed, with a 1-methylbenzoxazole or a $\mu$-methylnaphthoxazole quaternary salt, in the presence of an acylating agent, such, for example, as acetic, propionic or butyric anhydrides. Condensation of the anil salt and quaternary salt and acylation of the condensation product occur concomitantly to give a hexatrienyl compound of the following formula:

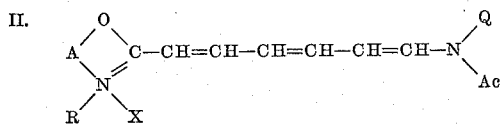

wherein A represents a phenylene or naphthylene group, Q represents an aryl group, R represents an alkyl group and X represents an acid radical. Heat accelerates the formation of the hexatrienyl compounds.

As anil compounds, I have found it advantageous to employ compounds of Formula I wherein Q and Q' represent the phenyl ($C_6H_5$) group. However, anil compounds wherein Q and Q' represent chlorophenyl, nitrophenyl or $\beta$-naphthyl for example, can be employed. I have also found it advantageous to employ the anil compound in the form of its hydrochloride, although other salts can be employed, e. g. the sulfates. Salts of anil compounds, such as those of Formula I are described by Zincke in Annalen, vol. 330, page 361 (1904); Zincke, Heuser and Möller in Annalen, vol. 333, page 296 (1904); Zincke and Würker in Annalen, vol. 338, page 107 (1905) and by König in Journal für praktische chemie, (2) vol. 69, page 129 and (2) vol. 70, pages 23 and 52.

As quaternary salts, I have found that those containing a simple nuclear substituent, such as chloro, amino or alkoxy, for example, can be employed as well as the unsubstituted quaternary salts. I have found it advantageous to employ the alk-halides, particularly the alkiodides, although other quaternary salts can be employed, such, for example, as the alkyl-p-toluenesulfonates, the alkyl sulfates, the alkoxyalkyl halides, the aralkyl halides, or the like.

While the process of preparing my new dyes is subject to variation, particularly with respect to the nature and quantity of the hexatrienyl compound employed, the nature and the quantity or the 1-methylbenzoxazole or $\mu$-methylnaphthoxazole quaternary salt employed, the nature and quantity of the basic condensing agent employed, the nature and quantity of the diluent employed, the order of procedure and method of isolation of the dye and the temperatures employed, the following examples will serve to illustrate the mode of practicing the process of my invention. These examples are not intended to limit my invention.

EXAMPLE 1.—*2,2'-diethyloxatricarbocyanine iodide*

5.8 g. (1 mol.) of 1-methylbenzoxazole ethiodide and 5.5 g. (1 mol.) of glutaconic aldehyde dianilide hydrochloride were heated in the presence of acetic anhydride (25 cc.) for about five minutes. The reaction mixture was chilled and the product precipitated therefrom by the addition of diethyl ether. The product, 1-(6-acetanilido-$\Delta^{1,3,5}$-hexatrienyl)-benzoxazole ethiodide, was purified by stirring in the cold with acetone, filtering and washing with acetone.

1.5 g. (1 mol.) of 1-(6-acetanilido-$\Delta^{1,3,5}$-hexatrienyl)-benzoxazole ethiodide, 3 g. (1 mol.) of 1-methylbenzoxazole ethiodide, 25 cc. of absolute ethyl alcohol, and 1.5 g. (1 mol.+300% excess)

of triethylamine were refluxed for about five minutes. The dye was precipitated from the reaction mixture by chilling and the addition of diethyl ether thereto. Upon recrystallization from methyl alcohol, the dye was obtained as blue-gray crystals, melting at 175° to 177° C. with decomposition. The formula of the dye can be represented as follows:

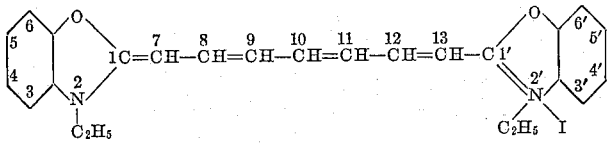

EXAMPLE 2.—*2,2'-diethyl-5,6,5',6'-dibenzoxatricarbocyanine iodide*

0.55 g. (1 mol.) of 1-(6-acetanilido-$\Delta^{1,3,5}$-hexatrienyl)-α-naphthothiazole ethiodide, 2.1 g. (1 mol.+500% excess) of 1-methyl-α-naphthoxazole ethiodide and about 10 cc. of absolute ethyl alcohol were heated to refluxing. 0.4 g. (1 mol.+300% excess) of triethylamine were added and the refluxing was continued for about 15 minutes. The dye separated from the reaction mixture upon chilling to about 0° C. The dye was filtered off and washed well with methyl alcohol. The dye was recrystallized from methyl alcohol and obtained light greenish crystals melting at 204° to 206° C. with decomposition. The formula of this dye is:

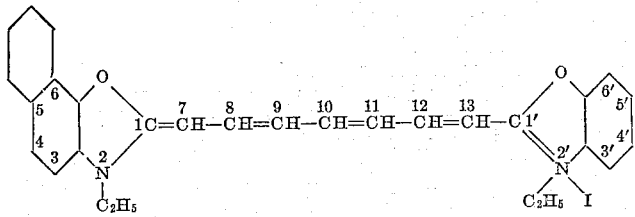

EXAMPLE 3.—*2,2'-diethyl-5,6-benzoxatricarbocyanine iodide*

3.4 g. (1 mol.) of 1-methyl-α-naphthoxazole ethiodide and 2.8 g. (1 mol.) of glutaconic aldehyde dianilide hydrochloride and about 40 cc. of acetic anhydride were refluxed together for about 5 minutes. The reaction mixture was chilled and the product, 1-(6-acetanilido-$\Delta^{1,3,5}$-hexatrienyl)-α-naphthoxazole ethiodide separated. It was filtered and washed with acetone.

1.1 g. (1 mol.) of 1-(6-acetanilidovinyl-$\Delta^{1,3,5}$-hexatrienyl)-α-naphthoxazole ethiodide, 4 g. (1 mol.+500% excess) of 1-methylbenzoxazole ethiodide and about 20 cc. of absolute ethyl alcohol were heated to refluxing. 1.5 g. (1 mol.+600% excess) of triethylamine and refluxing was continued for about 10 minutes. The dye separated from the chilled reaction mixture upon the addition of diethyl ether thereto. The dye was recrystallized from methyl alcohol and obtained as greenish crystals melting at 172° to 174° C. with decomposition. The dye can be represented by the following formula:

In the above examples, quaternary salts other than the alkiodides of 1-methylbenzoxazole and 1-methyl-α-naphthoxazole can be employed to react with the hexatrienyl compound, for example quaternary salts such as the alkyl-p-toluenesulfonates and alkyl-sulfates. Instead of quaternary salts of 1-methyl-α-naphthoxazole, quaternary salts of 2-methyl-β-naphthoxazole can be employed either to form the hexatrienyl compound or to react with the hexatrienyl compounds. I have found it advantageous to employ an excess of quaternary salt to react with the hexatrienyl compound. Excesses of from about 100% to about 500%, i. e. from about two to about six molecular proportions of quaternary salt for each molecular proportion of hexatrienyl compound are particularly useful.

As strong organic bases, I include organic bases having an ionization constant substantially greater than that of pyridine, i. e. organic bases whose aqueous solutions have a dissociation constant substantially greater than that of an aqueous solution of pyridine. Examples of such strong organic bases are triethylamine, triethanolamine, trimethylamine, diethylamine, tributylamine, piperidine and N-methylpiperidine. The strong organic bases can be employed in the form of their weak acid salts, e. g. guanidine carbonate. As strong organic base condensing agents, I have found that strong tertiary organic bases such as trialkylamines, e. g. triethylamine, or N-methylpiperidine are advantageously employed. I have further found that an excess of strong organic base condensing agent is advantageously employed. Excess of from 100% to 600%, i. e. from about two to about seven molecular proportions of strong organic base for each molecular proportion of hexatrienyl compound, are particularly useful.

In the condensation of the hexatrienyl compound, I have found it advantageous to employ a diluent for the reactants. Lower aliphatic alcohols, i. e., those containing from one to four carbon atoms are advantageously employed, I have found. Other diluents can be employed. The diluent is advantageously one that permits the dye which is formed to separate from the

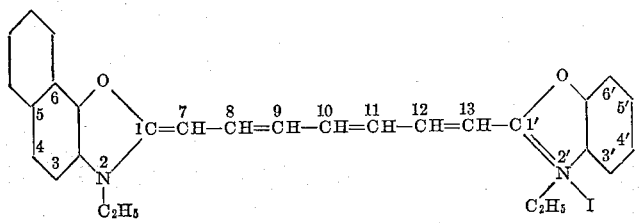

reaction mixture at least upon cooling. Heat accelerates the formation of my new dyes.

My new dyes give rise to photographic emulsions possessing novel sensitivity when incorporated therein. Employing my new dyes, I have found a new and improved method of sensitizing emulsions to the far-red and infra-red. In sensitizing photographic emulsions to the far-red and infra-red, a difficulty always encountered is the fogging of the emulsions. The reasons for this fogging are not apparent, but it is well known that emulsions sensitized to the aforesaid regions cannot long be kept free from fog. Employing my new dyes, I have been able to sensitize emulsions strongly to the far-red and infra-red and have obtained clean (not fogged) emulsions which can be employed in the manufacture of photographic elements (plates and films, for example) which do not exhibit fogging upon storage.

The photographic elements made from my new emulsions are of particular utility in distance or aerial photography. As is well known, distance or aerial photography is best accomplished by employing photographic elements containing emulsions sensitized to the far-red and infra-red owing to the "scattering" effect of mist in the lower atmospheric layers, which effect is maximum in the ultra-violet and decreases toward the red, reaching a practical minimum at a wave length of about 700 mu. In the far-red and infra-red range, however, the effective radiation intensities (hereinafter called effective light intensities) are not equal at the various wave lengths. For example, between 710 mu and 770 mu the effective light intensities are appreciably decreased at a band which can be roughly defined as from about 720 mu to about 730 mu owing to water vapor absorption of the light. Likewise, the so-called oxygen band which can be roughly defined as extending from about 750 mu to about 760 mu cuts down the light intensity. For the range extending from about 715 mu to about 770 mu, the effective light intensity is greatest at, roughly, from about 735 mu to about 745 mu. It is a surprising and totally unpredictable fact that my new emulsions exhibit maximum and strong sensitivity at from about 735 mu to about 750 mu. Because of this fact, photographic elements made from my new emulsions are particularly efficacious in making distance or aerial photographs.

My invention is particularly directed to the sensitization of the customarily employed gelatino-silver-halide emulsions. However, my new dyes can be employed in emulsions in which the carrier is other than gelatin, for example, a resinous substance or cellulosic derivative which has substantially no deleterious effect on the light-sensitive materials. As silver halide emulsions, I include such emulsions as are commonly employed in the art, for example, silver chloride or silver bromide emulsions which can contain other salts which may be light-sensitive. By way of illustration, the herein-described sensitized photographic emulsions were prepared employing ordinary gelatino-silver-bromide emulsions.

In the preparation of photographic emulsions containing my new unsymmetrical dyes, it is only necessary to disperse the dyes in the emulsions. The methods of incorporating dyes in emulsions are simple and well known to those skilled in the art. In practicing my invention it is convenient to add the dyes from their solutions in appropriate solvents. The solvent must, of course, be compatible with the emulsion, substantially free from any deleterious effect on the light-sensitive materials and capable of dissolving the dyes. Methanol has proven satisfactory as a solvent for my new dyes. The dyes are advantageously incorporated in the finished, washed emulsion and should be uniformly distributed throughout to secure the best results.

The concentration of my new unsymmetrical dyes in the emulsions can vary widely, e. g., from about 0.2 to about 20 mg. per liter of flowable emulsion. The concentration of the dye will vary according to the type of light-sensitive material in the emulsion and according to the effects desired. The suitable and most economical concentration for any given emulsion will be apparent to those skilled in the art, upon making the ordinary tests and observations customarily used in the art of emulsion making. To prepare a gelatino-silver-halide emulsion, the following procedure is satisfactory: A quantity of the dye is dissolved in methyl alcohol or acetone and a volume of this solution (which may be diluted with water) containing from 0.2 to 20 mg. of dye is slowly added to about 1000 cc. of a flowable gelatino-silver-halide emulsion with stirring. Stirring is continued until the dye is uniformly and practically homogeneously dispersed. Ordinarily 0.2 to 5.0 mg. of dye per 1000 cc. of flowable emulsion will suffice to produce the maximum sensitizing effect with the ordinary gelatino-silver-halide emulsions. The above statements are only illustrative and not to be understood as limiting my invention in any sense, as it will be apparent that my dyes can be incorporated by other methods in many of the photographic emulsions customarily employed in the art, such, for instance, as by bathing the plate or film, upon which the emulsion has been coated, in a solution of the dye in an appropriate solvent, although such a method is ordinarily not to be preferred. The claims are intended to cover any combination of these new dyes with a photographic silver halide emulsion, whereby the dye exerts a sensitizing effect upon the emulsions, as well as a photographic element comprising a support, ordinarily transparent, upon which the light-sensitive emulsion is coated or spread and allowed to dry.

The accompanying drawing is by way of illustration and depicts the sensitivity of emulsions containing three of my new dyes. Each figure in the drawing is a diagrammatic reproduction of a spectrogram showing the sensitivity of the silver bromide emulsion containing one of my new dyes.

In Fig. 1, the sensitivity of an ordinary gelatino-silver-bromide emulsion containing 2,2'-diethyloxatricarbocyanine iodide is depicted. Maximum sensitivity is at about 735 mu.

Figure 2:
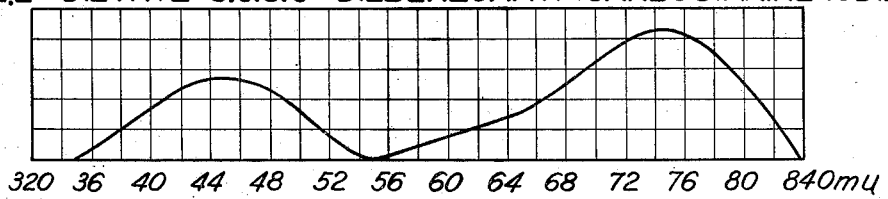

In Fig. 2, the sensitivity of an ordinary gelatino-silver-bromide emulsion containing 2,2'-diethyl-5,6,5',6'-dibenzoxatricarbocyanine iodide is depicted. Maximum sensitivity lies in the vicinity of 750 mu.

Figure 3:
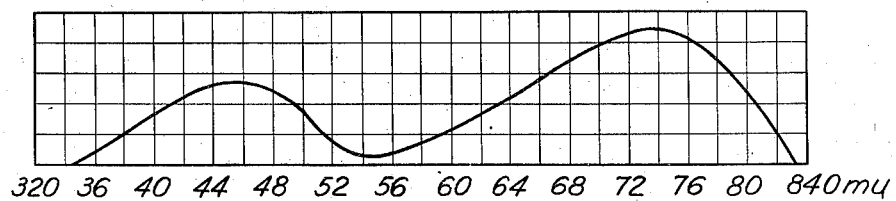

In Fig. 3, the sensitivity of an ordinary gelatino-silver-bromide emulsion containing 2,2'-diethyl-5,6-benzoxatricarbocyanine iodide is depicted. Maximum sensitivity lies just short of 740 mu.

In each of the illustrations, it is clear that the emulsions are very strongly sensitized in a region of relatively high light intensity. Still further illustrations of my invention could be given, but the foregoing will be sufficient to teach those skilled in the art the manner in which my invention is carried out.

Cyclammonium alkoxylalkyl and aralkyl quaternary salts as well as other cyclammonium substituted alkyl quaternary salts are fully described in the copending applications of Leslie G. S. Brooker and Lloyd A. Smith Serial No. 175,686, filed November 20, 1937 and Serial No. 180,214, filed December 16, 1937.

What I claim as my invention and desire to be secured by Letters Patent of the United States is:

1. A process for preparing a tricarbocyanine dye comprising reacting one molecular proportion of a hexatrienyl compound selected from the group consisting of 1-(6-acylarylamino-$\Delta^{1,3,5}$-hexatrienyl)-benzoxazole quaternary salts and $\mu$-(6-acylarylamino-$\Delta^{1,3,5}$-hexatrienyl)-naphthoxazole quarternary salts with at least one molecular proportion of a quaternary salt selected from the group consisting of 1-methylbenzoxazole quaternary salts and $\mu$-methylnaphthoxazole quaternary salts, in the presence of at least one molecular proportion of a strong organic base whose aqueous solution has a dissociation constant substantially greater than that of an aqueous solution of pyridine.

2. A process for preparing a tricarbocyanine dye comprising reacting one molecular proportion of a hexatrienyl compound selected from the group consisting of 1-(6-acylarylamino-$\Delta^{1,3,5}$-hexatrienyl)-benzoxazole quaternary salts and $\mu$-(6-acylarylamino-$\Delta^{1,3,5}$-hexatrienyl)-naphthoxazole quaternary salts with from about two to about six molecular proportions of a quaternary salt selected from the group consisting of 1-methylbenzoxazole quaternary salts and $\mu$-methylnaphthoxazole quaternary salts, in the presence of from about two to about seven molecular proportions of a strong organic base whose aqueous solution has a dissociation constant substantially greater than that of an aqueous solution of pyridine.

3. A process for preparing a tricarbocyanine dye comprising reacting a hexatrienyl compound selected from the group consisting of 1-(6-acylarylamino-$\Delta^{1,3,5}$-hexatrienyl)-benzoxazole quaternary salts and $\mu$-(6-acylarylamino-$\Delta^{1,3,5}$-hexatrienyl)-naphthoxazole quaternary salts with a quaternary salt selected from the group consisting of 1-methylbenzoxazole quaternary salts and $\mu$-methylnaphthoxazole quaternary salts, in the presence of a strong organic base whose aqueous solution has a dissociation constant substantially greater than that of an aqueous solution of pyridine.

GRAFTON H. KEYES.